Jan. 28, 1964 R. S. BURKET 3,119,492

TRAY PACKAGES

Filed Nov. 29, 1961 2 Sheets-Sheet 1

INVENTOR
RICHARD SAMUEL BURKET

BY Lynn Barratt Morris
ATTORNEY

TRAY PACKAGES

Filed Nov. 29, 1961 2 Sheets-Sheet 2

INVENTOR

RICHARD SAMUEL BURKET

BY Lynn Barratt Morris

ATTORNEY

United States Patent Office 3,119,492
Patented Jan. 28, 1964

3,119,492

TRAY PACKAGES

Richard Samuel Burket, Old Bridge, N.J., assignor to E. I. du Pont de Nemours and Company, Wilmington, Del., a corporation of Delaware Filed Nov. 29, 1961, Ser. No. 155,655
8 Claims. (Cl. 206—62)

This invention relates to a tray for holding a curved sensitive plate, to a unitary tray package and to a complete package of a plurality of unitary tray packages.

In packaging plates having sensitive surfaces, it is important that the surfaces be kept free from damage during assembly, transportation and removal of the plates from the package for use. In the packaging of photopolymerizable printing plates of the types described in U.S. Patents 2,791,504, 2,923,673, 2,927,022 and 2,951,758, this is especially true. These plates comprise a support and a photopolymerizable layer, the surface of which should be kept free from dust and untouched. Thus dust specks, scratches, indentations and abrasions should be avoided as they lead to defective printing surfaces.

An object of this invention is to provide a simple but effective tray for holding a curved sensitive plate in position so that the sensitive surface cannot be damaged. Another object is to provide such a tray that can be readily assembled with a sensitive plate and in which resulating unitary tray package, the sensitive surface of the plate will be protected. A further object is to provide packages of a plurality of unitary tray packages, each containing a curved, sensitive plate. Still further objects will be apparent from the following statements of invention and description of the invention.

The novel tray of this invention comprises a shallow, rectangular tray having a bottom, end walls and side walls, each side wall having (*a*) a lateral top segment, (*b*) an inner wall slanting downwardly toward the bottom of the side wall and (*c*) a lateral base segment extending inwardly from said inner wall, the top segment, inner wall and base segment being Z-shaped in cross section, said tray being adapted to receive a curved sensitive plate. The side edges of the curved plate are disposed in the groove formed by the slanting inner wall and the base segment.

The novel tray is preferably made of a single sheet of box-making material which is cut to form side and end flaps which are cut and folded to form the tray previously described. The unitary tray package of the invention comprises the tray and the enclosed plate.

The novel complete packages of the invention comprise a plurality of the unit tray packages placed adjacent to each other in a container provided with front, back and side walls and top and bottom enclosure members, the bottom of each successive tray resting on the top segment of the adjacent tray. The tray packages can be encased in a sheath extending around the group of tray packages. If desired, one or two additional trays can be placed in the package with their bottom or bottoms disposed adjacent the side walls of the inner trays and the sheath is disposed in a protective plastic pouch or bag before it is inserted in the outer container.

Figure 3:
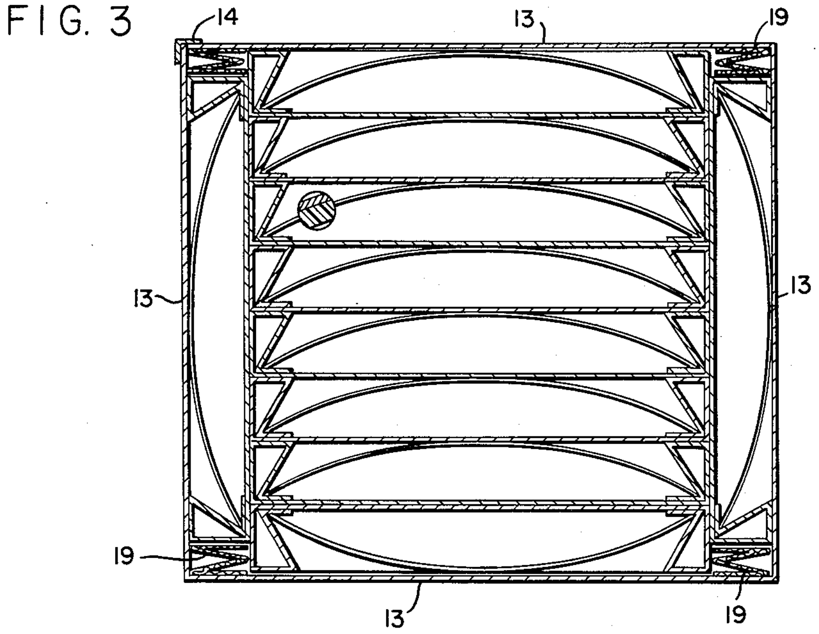
Figure 1:
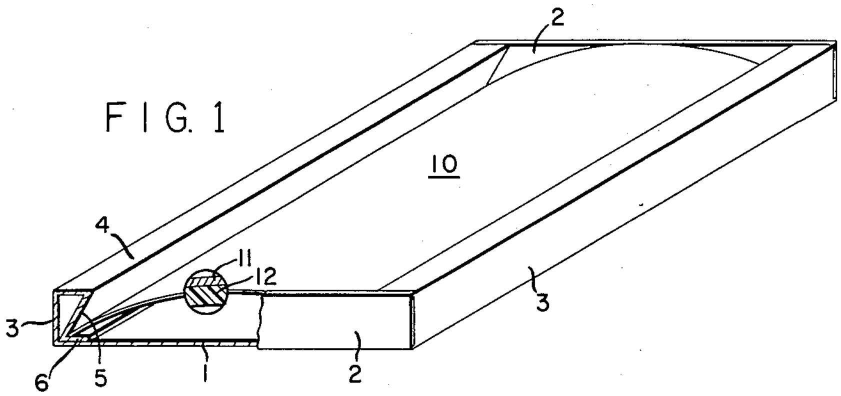
Figure 2:
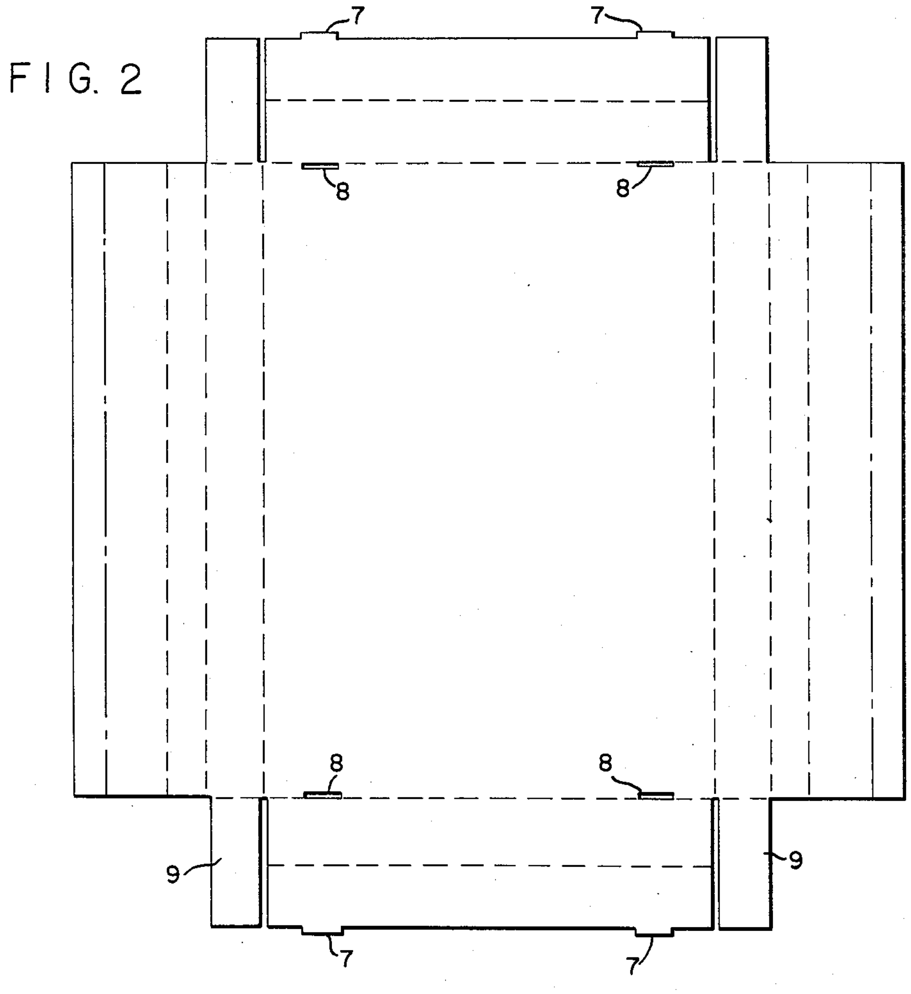
Figure 4:
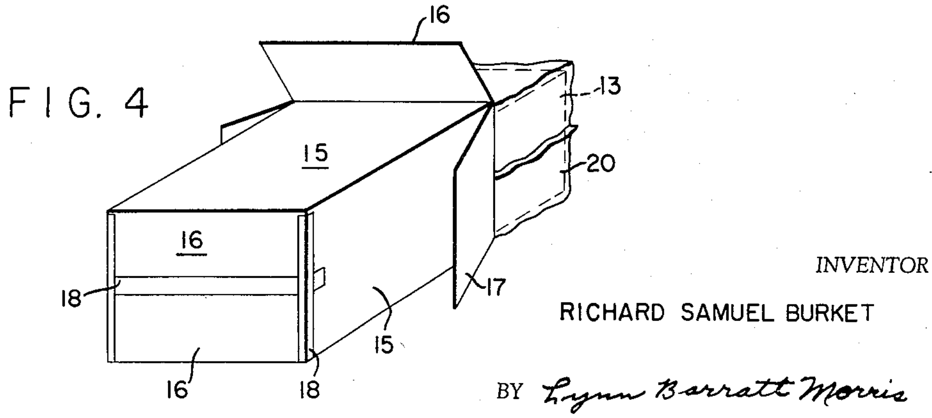

Both the unit tray package unit and the complete packages of the invention will now be described with reference to the accompanying drawings which form a part of this application, and wherein FIG. 1 is a perspective view of a unit tray package embodying a curved sensitive plate, FIG. 2 is a plan view of a cut, but unfolded sheet of material for a unit tray package, FIG. 3 is a sectional view of a complete inner assembly showing a sheath containing a plurality of unit tray packages embodying curved sensitive plates, and FIG. 4 is a perspective view of the outer carton and inner plastic bag liner for the complete package.

Referring now to the drawings and more particularly to FIGS. 1 and 2, the unitary tray package consists of a shallow rectangular tray having a flat bottom 1, end walls 2, and side walls 3. Each of the side walls has a lateral horizontal top segment portion 4 and this segment is extended downwardly and toward the side wall to form an inner wall 5. The lower end of this inner wall is then extended laterally along the base to form base segment 6.

As shown in FIG. 2 on the drawing, the end walls and side walls are shown in a flat and unfolded condition. The end walls as shown have a width approximately twice their normal height when in folded condition. These end walls are folded along their medium line and protruding tabs 7 of the end walls fit into coacting slots 8 in the bottom of the box. At each end of the side walls there are preferably two spaced narrow flaps 9 which constitute an extension of the side walls. The side walls, when unfolded, have a width equal to the total dimensions of the side walls, top segments, inner walls and base segments of the tray.

As shown in FIG. 1 of the drawing, a curved sensitive plate 10 is disposed in the tray, each side edge of the plate being disposed in the groove formed between the inner wall and the base segment referred to above. The curved plate preferably consists of a thin, flexible metal support 11 and a photo-sensitive surface 12.

A plurality of the unitary tray packages just described and shown in FIG. 1 of the drawing, are placed adjacent to each other in a sheath 13 which extends around the sides and tops of the assembled group of trays but need not be folded over their ends. The adjoining ends of the folded, wrap-around sheath can be held in place by means of tape 14. If desired, the ends of the sheath may overlap. These trays as shown in FIG. 3 of the drawing are disposed so that the bottom of each successive tray rests against the top segment of the adjacent tray.

The sheath 13 as shown in FIG. 4 is placed in an outer carton having front, back and side walls 15. These walls are preferably extended to form flaps 16 and 17 respectively, which are folded to form enclosures. These flaps can be sealed in any suitable manner, e.g., by folding, pressing and stapling, applying a suitable adhesive to the contacting surfaces, by applying pressured sensitive tape, or by applying a suitable thermoplastic tape and applying heat. Suitable sealing tapes 18 are shown in FIG. 4. In the preferred construction shown in FIG. 3 in addition to the unitary tray packages described above, there are also inserted in the sheath two additional unitary tray packages with the bottom surfaces of the latter contacting the respective side walls of the remaining packages. In the space at the corners of the carton there are preferably disposed folded, corrugated, cushioning packing members 19. These cushioning members serve to hold the trays in proper relationship and protect the corners of the package from damage.

If desired, the sheath 13 can be placed within a suitable plastic bag 20 which serves as an interliner for the unitary tray packages. This bag is shown in FIG. 4 of the drawing; the package, however, being placed on its back wall for convenience.

It will be apparent from the drawings and the foregoing description that the thickness of the walls of the carton, trays and of the sensitive plates have in some instances been exaggerated for the sake of clarity and understanding the nature of the invention. In FIGS. 1 and 3, the circular sections are magnifications of a type of photosensitive plate which can be safely packaged. The photosensitive surface in question is preferably of the type described in the patents listed above.

From the above description, it will be apparent that the invention provides a simple and practical means for packing flexible sensitive plates by the simple expedient of curving a flexible plate while inserting it in the unitary trays. This can be done in various ways; however, in the case where the plates are more pre-curved, one edge of the plate can be inserted in the groove formed by the slanting and side wall and bottom segment of one wall of the tray, inserting the other in the same type of groove before it is folded into the tray and then gently folding the inner wall and base segment into the tray. By this procedure, contact of the fingers on the photo-sensitive surface can be avoided which is an advantage of the invention.

Alternatively, flexible plates that can be readily curved by hand can be inserted in a completely assembled tray by placing one side edge of the plate in the appropriate groove between the slanting side wall and base segment, the plate then curved by placing the fingers at the other edge and bending the plate and slipping said end into place along the other slanting inner wall. Then by placing the fingers against the ends of the plate downwardly, the edge can be seated in proper position in the groove.

The sensitive plates can be removed from the unitary tray packages in a reverse manner from one of the manners described above. Since the sensitive surface should not be touched, this can be accomplished by placing the fingers at the ends of the curved plates in removing them.

The trays can be made of heavy cardboard, thick laminated paperboard, smooth surfaced corrugated paperboard, vulcanized paperboard and other materials. When the photopolymerizable elements such as those described in the patents listed above are packaged, it is, of course, desirable that the tray be made of dust-free material. Thus, the paperboard, cardboard, etc., preferably has a smooth, dust-free surface and should not shred or fray readily. These materials could be provided with a suitable sizing or varnish to render them dust-free.

The sheath and outer carton can be made of the same materials as the tray, but in general should be made of tougher and more sturdy materials. The inner surfaces of the carton can have a lining or lamination of a metal foil, e.g., aluminum foil, or can be composed of plastic material or other type of film, e.g., cellophane, polyethylene, polypropylene, polystyrene, rubber hydrochloride or other suitable lining material.

The plastic bag or pouch 20 used for the package can be made of any heavy plastic or foil, e.g., polyethylene, and the latter may contain a pigment or dye in order to render it lightproof. The pouch can be made of a laminate of scrim cloth with a polymeric film, e.g., polyethylene, or of a metal foil, e.g., aluminum, or a combination of such materials. The pouch can also be made of a suitable colored or impregnated heavy paper or paper/metal foil laminate or of a paper/cloth or cloth/metal laminate. In the case of heavy paper, e.g., kraft paper, it may be impregnated or coated with wax or a suitable paper varnish.

The cushioning packing members 19 can be made of any of the materials described above for the trays and outer cartons. In addition, other cushioning materials can be used, e.g., cellulosic sponge, polyurethane sponge, and related materials.

The outer cartons should be lightproof and moisture-proof in order to protect the sensitive plates in the package. This is especially true of photopolymerizable printing plates referred to above for which the present unitary tray packages and complete packages were expressly designed. In order to reduce the humidity within the packages, small bags or packages of a desiccant, e.g., silica gel, can be provided. This can be accomplished conveniently by placing the packages of desiccant materials in the corners of the packages.

While the invention has been described primarily in terms of packaging photosensitive plates and, more particularly, photopolymerizable printing plates, it is obvious that the invention can be used to package other types of flexible plates having a sensitive surface. Thus, the invention is useful for packaging presensitized flexible lithographic plates for offset printing. Also, the packages can be used to protect the surface of ferrotype plates, copper engravings, and flexible mirrors. Indeed, the invention is not limited to the packaging of flexible plates since in some cases stiff, curved plates can be packaged in a similar manner.

The present invention has many advantages as will be apparent from the foregoing descriptions and the accompanying drawings. A primary advantage of the invention is that the trays are simple in construction and yet protect the sensitive surface from possible damage due to scratching, abrasion, etc. Also the construction avoids finger prints being impressed on the sensitive surface. Another advantage is that the trays can be made from relatively inexpensive and readily available packaging materials.

One of the most important advantages of the invention resides in the fact that the sensitive surfaces of the curved plates are free from contact with any surface that might injure or mar them. The only contact with a surface is at the very corner edges of the sensitive surface. Thus, any damage to an expensive plate is limited practically to point contact at the corner edges.

A further advantage of the invention is that the trays can be readily cut and creased or scored by means of leather folding and pressing devices. The complete packages can be shipped by common carriers without damage to the contents, which is a further advantage of the invention. Still other advantages will be apparent to those skilled in the art.

I claim:

1. A unitary tray package comprising (1) a shallow rectangular tray having a bottom, vertical end walls, and side walls, each side wall having (*a*) a lateral top segment, (*b*) an inner wall slanting downwardly toward the bottom of the side wall, and (*c*) a lateral base segment extending inwardly from said inner wall, the top segment, inner wall and base segment being Z-shaped in cross section, and (2) a curved rectangular plate having a convex surface and a concave sensitive surface, the side edges of which are disposed in the groove formed by the slanting inner wall and the base segment and the two end edges of which are adjacent the respective vertical walls of said tray, the sensitive concave surface of the plate facing the bottom of the tray.

2. A unitary tray package according to claim 1 wherein the sensitive plate is a curved plate having a metal support and a photosensitive layer.

3. A unitary tray package according to claim 1 wherein the sensitive plate is a flexible plate having a thin metal support and a photopolymerizable layer.

4. A unitary tray package according to claim 1 wherein the tray is made of a single sheet of box-making material which is cut and folded to form said tray.

5. A package comprising an outer container containing a plurality of unitary tray packages as defined in claim 1, the bottom of each successive tray resting against the top segment of the adjacent trays.

6. A package comprising an outer container containing a stack of unitary tray packages as defined in claim 1, the bottom of each successive tray resting against the top segment of the adjacent tray and the stack of trays being encased in a protective sheath.

7. A package comprising an outer container containing a stack of unitary tray packages as defined in claim 1, the bottom of each successive tray resting against the top segment of the adjacent tray and two such unitary tray packages disposed in a vertical position with their respective top segments resting against the end walls of the stack of adjacent trays, the entire group of trays being encased in a protective sheath.

8. A package according to claim 7 wherein the unitary tray packages are contained in a protective sheath and the latter is in a plastic bag with the bottom of each successive tray resting on the top segment of the adjacent tray, the plastic bag being sealed and interfitting with said sheath.

References Cited in the file of this patent

UNITED STATES PATENTS

| | | |
|---|---|---|
| 1,453,071 | Kleeman | Apr. 24, 1923 |
| 2,328,356 | Ott | Aug. 31, 1943 |
| 2,546,875 | Soloman | Mar. 27, 1951 |
| 2,734,626 | Koester et al. | Feb. 14, 1956 |
| 2,981,455 | Cope | Apr. 25, 1961 |

FOREIGN PATENTS

| | | |
|---|---|---|
| 161,798 | Sweden | Dec. 31, 1957 |
| 1,032,765 | France | Apr. 1, 1953 |
| 1,218,534 | France | Dec. 21, 1959 |